(12) United States Patent
Watanabe et al.

(10) Patent No.: US 11,001,046 B2
(45) Date of Patent: May 11, 2021

(54) POLYBUTYLENE TEREPHTHALATE RESIN POWDER MIXTURE

(71) Applicant: Toray Industries, Inc., Tokyo (JP)

(72) Inventors: Kei Watanabe, Tokai (JP); Kazusada Takeda, Tokai (JP); Yosuke Nishimura, Nagoya (JP); Hiroshi Takezaki, Nagoya (JP); Hisashi Miyama, Tokyo (JP); Mikiya Nishida, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/590,826

(22) Filed: Oct. 2, 2019

(65) Prior Publication Data
US 2020/0040204 A1  Feb. 6, 2020

Related U.S. Application Data

(63) Continuation-in-part of application No. 15/740,141, filed as application No. PCT/JP2016/063241 on Apr. 27, 2016, now abandoned.

(30) Foreign Application Priority Data

Jun. 29, 2015 (JP) .................. 2015-129966

(51) Int. Cl.
 B33Y 10/00 (2015.01)
 B29C 64/153 (2017.01)
 C09D 11/104 (2014.01)
 C09D 11/037 (2014.01)
 B33Y 70/00 (2020.01)
 B29K 67/00 (2006.01)

(52) U.S. Cl.
 CPC ............ B33Y 10/00 (2014.12); B29C 64/153 (2017.08); B33Y 70/00 (2014.12); C09D 11/037 (2013.01); C09D 11/104 (2013.01); B29K 2067/006 (2013.01)

(58) Field of Classification Search
 CPC ............................ B29C 64/153; B33Y 70/00
 See application file for complete search history.

(56) References Cited

U.S. PATENT DOCUMENTS

| 4,038,477 A | 7/1977 | Inoue et al. |
| 7,569,273 B2 * | 8/2009 | Bredt .................... C08L 101/00 |
| | | 428/402 |
| 2011/0070442 A1 | 3/2011 | Asano et al. |
| 2012/0208118 A1 | 8/2012 | Farrugia |
| 2018/0186926 A1* | 7/2018 | Watanabe .............. C08K 3/013 |

FOREIGN PATENT DOCUMENTS

| JP | 51-62858 A | | 5/1976 |
| JP | 63-248875 A | | 10/1988 |
| JP | 2004148627 A | * | 5/2004 |
| JP | 2006-17954 A | | 1/2006 |
| JP | 2006-206897 A | | 8/2006 |
| JP | 2010-31104 A | | 2/2010 |
| JP | 2011-184522 A | | 9/2011 |
| JP | 2012-167274 A | | 9/2012 |
| JP | 2012-197461 A | | 10/2012 |
| JP | 2013-119565 A | | 6/2013 |
| JP | 2013-166667 A | | 8/2013 |
| JP | 2015-83668 A | | 4/2015 |

OTHER PUBLICATIONS

Machine translation JP 2004-148627A, published May 27, 2004.*
"Terminology Dictionary of Powder Technology—2nd Edition," edited by the Society of Powder Technology, Japan, published by Nikkan Kogyo Shimbun, Ltd., Mar. 30, 2000, pp. 56-57 w/partial English translation.

* cited by examiner

Primary Examiner — Vickey Nerangis
(74) Attorney, Agent, or Firm — DLA Piper LLP (US)

(57) ABSTRACT

A method of producing polybutylene terephthalate resin shaped moldings includes supplying a 3D printer with a polybutylene terephthalate resin powder mixture that contains 100 parts by weight of a polybutylene terephthalate resin powder material having a mean diameter of more than 1 µm and 100 µm or less, a uniformity coefficient of 4 or less, and a terminal carboxyl group quantity of 35 eq/t or more and 50 eq/t or less, and 0.1 to 5 parts by weight of inorganic particles having a mean diameter of 20 to 500 nm.

6 Claims, No Drawings

POLYBUTYLENE TEREPHTHALATE RESIN POWDER MIXTURE

TECHNICAL FIELD

This disclosure relates to a polybutylene terephthalate resin powder mixture that is small in mean diameter, high in powder flowability, low in compressability, resistant to viscosity increase during supply to and shaping by a 3D printer, and useful to provide high strength moldings.

BACKGROUND

For production of three dimensional moldings, a technique called rapid prototyping (RP) is known. In that technique, data describing the surface of a three dimensional shape as a set of triangles (such data are described in standard triangulated language (STL) format) are used to calculate the cross-sectional shapes sliced in the stacking direction, and layers are formed according to the shapes to produce a three dimensional object. Powder bed fusion, in particular, is a method that includes a thin layer formation step of expanding powder into a thin layer and a cross-sectional shape formation step of exposing the resulting thin layer to laser light in a shape that corresponds to the cross section of an intended object to fuse the powder, which are repeated in this order to produce the object. The method, compared to other shaping methods, is suitable for fine shaping and advantageous in that it requires no support members. The technique is favorable as a process to produce a complicated shape that is difficult to produce by conventional molding methods such as injection molding and extrusion molding.

Polyesters such as polybutylene terephthalate (hereinafter occasionally abbreviated as PBT) have properties suitable as engineering plastics including excellent heat resistance, barrier property, chemical resistance, electrical insulation, and moist heat resistance, and have been used in various electric/electronic parts, machine parts, automobile parts, films, fibers, and the like that are produced mainly by injection molding or extrusion molding.

Having such excellent properties, polyester resin particulate products are much in demand as materials for various moldings, printer toners, coatings, heat resistant additives and the like, and some techniques such as described below, have been proposed to produce polyester resin particulate products.

Japanese Unexamined Patent Publication (Kokai) No. SHO 63-248875 describes a method in which saturated polyester resin pellets are heated and dissolved in dimethyl acetamide or dimethyl formamide and gradually cooled to obtain powder material.

Japanese Unexamined Patent Publication (Kokai) No. 2012-197461 discloses a method in which an emulsion consisting mainly of two separated phases that contain different polymers as main components is formed and then a poor solvent for either of the polymers is brought into contact with the emulsion to precipitate that polymer, thereby providing fine polymer particles.

To improve the fluidity of resin powder material, Japanese Unexamined Patent Publication (Kokai) No. 2013-166667 proposes a method in which inorganic particles are added to increase the distances among particle to relax the interaction among the particles.

However, when a polyester resin powder material produced by the method described in JP '875 or JP '461 is used for molding, its excellent electrical insulating properties will lead to a low flowability as a result of its coagulation which will be easily caused by static electricity, resulting in frequent troubles in supply and discharge in silos during the production process. In addition, polyester resin powder materials are high in compressability and suffer from an increase in bulkiness and a further decrease in flowability at the bottoms of the silo, hopper or the like, as a result of compression caused by powder pressure.

It could therefore be helpful to provide for efficient production of a polybutylene terephthalate resin powder material that is small in mean diameter, high in powder flowability, low in compressability, resistant to viscosity increase during supply to and shaping by a 3D printer, and useful to form high strength moldings.

SUMMARY

We thus provide:
(1) A method of producing polybutylene terephthalate resin moldings shaped by supplying a 3D printer with a polybutylene terephthalate resin powder mixture that contains 100 parts by weight of polybutylene terephthalate resin powder material having a mean diameter of more than 1 μm and 100 μm or less, a uniformity coefficient of 4 or less, and a quantity of terminal carboxyl groups of 35 eq/t or more and 50 eq/t or less, and 0.1 to 5 parts by weight of inorganic particles having a mean diameter of 20 to 500 nm.
(2) A method of producing polybutylene terephthalate resin moldings as set forth in paragraph (1), wherein the inorganic particles are silica particles.
(3) A method of producing polybutylene terephthalate resin moldings as set forth in either paragraph (1) or (2), wherein an inorganic reinforcement material having an average maximum size of 1 μm or more and 200 μm or less accounts for 25 to 150 parts by weight relative to 100 parts by weight of the polybutylene terephthalate resin powder material.
(4) A method of producing polybutylene terephthalate resin moldings as set forth in paragraph (3), wherein the inorganic reinforcement material is at least one selected from the group consisting of glass beads, glass flakes, glass fiber, carbon fiber, aluminum oxide, soda lime glass, borosilicate glass, aluminosilicate ceramics, limestone, gypsum, bentonite, precipitated sodium silicate, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement, and zinc oxide.

Our methods efficiently produce a polybutylene terephthalate resin powder mixture that is small in mean diameter, high in powder flowability, low in compressability, resistant to viscosity increase during supply to and shaping by a 3D printer, and useful to provide high strength moldings.

DETAILED DESCRIPTION

Polybutylene Terephthalate Resin

A polybutylene terephthalate resin is a resin in which polybutylene terephthalates account for 80 wt % or more, preferably 85 wt % or more, and it may be copolymerized or mixed with another resin that is not a polybutylene terephthalate resin. A polybutylene terephthalate is a polybutylene terephthalate containing a butylene terephthalate component as main repeating unit. The main repeating unit as referred to here is one that accounts for 80 mol % or more, preferably 85 mol % or more, of the total repeating units. Other acid components include aromatic dicarboxylic acids such as isophthalic acid, orthophthalic acid, naphthalene dicarboxylic acid, diphenyl dicarboxylic acid, and sodium sulfoisophthalic acid; alicyclic dicarboxylic acids such as cyclohexanedicarboxylic acid and deca phosphorus dicarboxylic acid; and aliphatic dicarboxylic acids such as oxalic acid, malonic acid, succinic acid, sebacic acid, adipic acid, and dodecanedioic acid; whereas specific examples of such other diol components that may be used partially include aliphatic diols such as ethylene glycol, diethylene glycol, triethylene glycol, polyethylene glycol, propylene glycol, neopentyl glycol, 1,6-hexanediol, polypropylene glycol, and polytetramethylene glycol; alicyclic diols such as 1,4-cyclohexanediol and 1,4-cyclohexanedimethanol; and aromatic diols such as 2,2-bis(4'-hydroxyphenyl) propane. Each of these copolymerization components preferably accounts for 40 mol % or less relative to the terephthalic acid or 1,4-butanediol.

The polybutylene terephthalate resins preferably have a weight average molecular weight of 1,000 to 1,000,000. The lower limit of weight average molecular weight is preferably 1,000, more preferably 5,000, and still more preferably 10,000. The upper limit of weight average molecular weight is preferably 1,000,000, more preferably 500,000, particularly preferably 100,000, and most preferably 50,000.

A high strength will not be achieved during the molding process if the weight average molecular weight of the polybutylene terephthalate resin is less than 1,000, whereas the melt viscosity will increase to make molding difficult if it is more than 1,000,000.

The weight average molecular weight as referred to herein means a weight average molecular weight measured by gel permeation chromatography (GPC) using 1,1,1,3,3,3-hexafluoro-2-propanol as solvent and converted in terms of polystyrene.

Furthermore, the difference between the crystallization temperature and the melting point of the polybutylene terephthalate resin is preferably 30° C. or more. The melting point and the crystallization temperature referred to here mean the temperature at the endothermic peak attributed to melting and that at the exothermic peak attributed to crystallization determined during a differential scanning calorimetry (DSC) process in which the polymer is heated once over a temperature range from 30° C. to a temperature 30° C. above its melting point at a heating rate of 20° C./min, maintained there for one minute, and then cooled to 0° C. at a rate of 20° C./min. Shrinkage or warp may be caused during shaping in a powder bed fusion type 3D printer as a result of crystallization of the polybutylene terephthalate resin once melted by exposure to laser if the difference between the crystallization temperature and the melting point of the polybutylene terephthalate resin is less than 30° C.

In a polybutylene terephthalate, it is necessary for the quantity of terminal carboxyl groups to be 35 eq/t or more and 50 eq/t or less. The upper limit of the quantity of terminal carboxyl groups is preferably 50 eq/t, more preferably 48 eq/t, and still more preferably 45 eq/t. On the other hand, the lower limit of the quantity of terminal carboxyl groups is preferably 35 eq/t, more preferably 37 eq/t. If the quantity of terminal carboxyl groups is more than 50 eq/t, the three-dimensional shaped product shaped by a 3D printer will be extremely low in hydrolysis resistance. If the quantity of terminal carboxyl groups is less than 35 eq/t, on the other hand, the polybutylene terephthalate will be too high in the reaction rate during solid phase polymerization. During shaping by a 3D printer, the resin powder material used as a raw material is heated at a high temperature for a long period of time and accordingly, if the polybutylene terephthalate is too high in the rate of reaction in the solid phase polymerization step, defective shaping can occur as a result of a considerably large increase in viscosity in the shaping step.

Polybutylene Terephthalate Resin Powder Material

A polybutylene terephthalate resin powder material having a mean diameter of more than 1 μm and 100 μm or less is used. The lower limit of the mean diameter of the polybutylene terephthalate resin powder material is preferably 3 μm, more preferably 5 μm, still more preferably 8 μm, particularly preferably 10 μm, extremely preferably 13 μm, and most preferably 15 μm. The upper limit of the mean diameter is preferably 95 μm, more preferably 90 μm, still more preferably 85 μm, particularly preferably 80 μm, extremely preferably 75 μm, and most preferably 70 μm.

In addition, the polybutylene terephthalate resin powder material preferably has a uniform particle size distribution. A polybutylene terephthalate resin powder material having a smaller uniformity coefficient has a lower compressability under powder pressure, and the polybutylene terephthalate resin should have a uniformity coefficient of 4 or less. The polybutylene terephthalate resin powder material preferably has a uniformity coefficient of 3.2 or less, more preferably 3.0 or less, still more preferably 2.8 or less, particularly preferably 2.5 or less, and extremely preferably 2 or less. The lower limit of the uniformity coefficient is theoretically 1, but practically, it is preferably 1.1 or more, more preferably 1.15 or more, still more preferably 1.2 or more, particularly preferably 1.3 or more, and extremely preferably 1.4 or more. If the polybutylene terephthalate resin powder material has a uniformity coefficient of more than 4, the compressability will be too large to realize the advantageous effects even if the mean diameter is within the appropriate range.

The mean diameter of a polybutylene terephthalate resin powder material means the d50 particle diameter, which corresponds to 50% accumulation counted from the smaller end of the particle diameter distribution curve measured by a laser diffraction type particle size analyzer according to Mie scattering/diffraction theory.

Furthermore, the uniformity coefficient of a polybutylene terephthalate resin powder material is calculated by dividing the d60 particle diameter, which corresponds to 60% accumulation counted from the smaller end of the particle diameter distribution curve measured as above, by the d10 particle diameter, which corresponds to 10% accumulation counted from the smaller end.

Inorganic Particles

It is important to add inorganic particles to further improve the flowability of the polybutylene terephthalate resin powder material. The flowability of the polybutylene terephthalate resin powder material deteriorates due to interactions with particles in the neighborhood as the particle diameter decreases, but the addition of inorganic particles smaller in particle diameter than the polybutylene terephthalate resin powder material acts to increase the interparticle distances, thereby improving the flowability.

The inorganic particles to be added to the polybutylene terephthalate resin powder material should have a mean diameter of 20 nm or more and 500 nm or less. The mean diameter referred to here is measured by the same method as used to determine the mean diameter of the polybutylene terephthalate resin powder material.

The upper limit of the mean diameter of the inorganic particles is preferably 400 nm, more preferably 300 nm, still more preferably 200 nm, particularly preferably 150 nm, and extremely preferably 100 nm. The lower limit is preferably 20 nm, more preferably 30 nm, still more preferably 40 nm, and particularly preferably 50 nm. If the inorganic particles have a mean diameter of more than 500 nm, they will fail to have a sufficiently large effect in improving the flowability of the polybutylene terephthalate resin powder mixture. If the mean diameter of the inorganic particles is less than 20 nm, on the other hand, they will fail to decrease the compressability of the polybutylene terephthalate resin powder mixture, which will lead to moldings with decreased strength, although they can have a flowability improving effect.

When added, inorganic particles of any material may serve effectively as long as they have a mean diameter in the ranges given above, but preferred materials include: calcium carbonate powder materials such as precipitated calcium carbonate, heavy calcium carbonate, fine powdered calcium carbonate, and special calcium based fillers;

clay (aluminum silicate powder) materials such as nepheline-syenite fine powder, calcined clay of montmorillonite, bentonite and the like, and silane-modified clay;

talc;

different types of silica (silicon dioxide) powder such as fused silica, crystal silica, and amorphous silica;

silicic acid-containing compounds such as diatomaceous earth and silica sand;

crushed natural mineral materials such as pumice powder, pumice balloons, slate powder, and mica powder;

alumina-containing compounds such as alumina (aluminum oxide), alumina colloid (alumina sol), alumina white, and aluminum sulfate;

mineral materials such as barium sulfate, lithopone, calcium sulfate, molybdenum disulfide, and graphite (black lead);

glass based fillers such as glass fiber, glass beads, glass flakes, and foamed glass beads; and others such as spherical fly ash particles, volcanic glass hollow particles, synthesize inorganic hollow particles, single-crystalline potassium titanate, carbon fiber, carbon nanotube, carbon hollow spherical particles, carbon 64 fullerene, anthracite powder, artificial cryolite (cryolite), titanium oxide, magnesium oxide, basic magnesium carbonate, dolomite, potassium titanate, calcium sulfite, mica, asbestos, calcium silicate, aluminum powder, molybdenum sulfide, boron fiber, and silicon carbide fiber; of which more preferable are calcium carbonate powder, silica powder, alumina-containing compounds, and glass-based fillers. Particularly preferable are various types of silica powder and among others, amorphous silica powder is extremely preferable from the industrial point of view because it is little harmful to human bodies.

There are no specific limitations on the shape of these inorganic particles, and they may be spherical, porous, hollow, or irregular, of which spherical shapes are preferable from the viewpoint of high flowability.

The spherical shapes referred to in this instance include not only the perfect sphere, but also deformed spheres. The shape of an inorganic fine particle is evaluated on the basis of the circularity of the particle projected onto a two-dimensional plane. The circularity referred to above is calculated by dividing the circumference of a circle having the same area as the projected particle image by the circumference of the projected particle. The average circularity of such inorganic particles is preferably 0.7 or more and 1 or less, 0.8 or more and 1 or less, and still more preferably 0.9 or more and 1 or less.

Different silica powder materials are roughly divided by the production method into fumed silica produced by combustion of a silane compound, deflagrated silica produced by explosive combustion of metal silicon powder, wet silica produced by neutralization of sodium silicate and a mineral acid (including precipitated silica produced by synthesis and coagulation under alkaline conditions and gelled silica produced by synthesis and coagulation under acidic conditions), colloidal silica (silica sol) produced by synthesis of an acidic silicic acid from sodium silicate through sodium removal with ion exchange resin, followed by its polymerization under alkaline conditions, and sol-gel silica produced by hydrolysis of a silane compound, of which sol-gel silica is preferred to realize the advantageous effect.

Thus, the use of inorganic particles of silica is preferable, and the use of sol-gel silica and/or spherical silica is more preferable. Among others, the use of sol-gel spherical silica is most preferable.

It is still more preferable to use particles that are surface-hydrophobized with a silane compound, silazane compound or the like. Such surface hydrophobization serves to depress the coagulation of the inorganic particles and enhance the dispersion of the inorganic particles into the polybutylene terephthalate resin powder material. Such silane compounds as described above include, for example, non-substituted or halogen-substituted trialkoxysilanes such as methyl trimethoxysilane, methyl triethoxysilane, ethyl trimethoxysilane, ethyl trieth-oxysilane, n-propyl trimethoxysilane, n-propyl triethoxysilane, isopropyl trimethoxysilane, isopropyl trieth-oxysilane, butyl trimethoxysilane, butyl triethoxysilane, hexyl trimethoxysilane, trifluoropropyl trimethoxysilane, and heptadecafluorodecyl trimethoxysilane, of which preferable are methyl trimethoxysilane, methyl triethoxysilane, ethyl trimethoxysilane and ethyl triethoxysilane, of which more preferable are methyl trimethoxysilane, methyl triethoxysilane, and partial hydrolysis condensation products thereof. Such silazane compounds as described above include, for example, hexamethyl disilazane and hexaethyl disilazane, of which hexamethyl disilazane is more preferable. Useful monofunctional silane compounds include, for example, monosilanol compounds such as trimethyl silanol and triethyl silanol;

monochlorosilanes such as trimethyl chlorosilane and triethyl chlorosilane;

monoalkoxysilanes such as trimethyl methoxysilane and trimethyl ethoxysilane;

monoaminosilanes such as trimethylsilyl dimethylamine and trimethylsilyl diethylamine; and monoacyl oxysilanes such as trimethyl acetoxy silane; of which preferable are trimethyl silanol, trimethyl methoxysilane, and trimethylsilyl diethylamine, of which particularly preferable are trimethyl silanol and trimethyl methoxysilane.

These inorganic particles may be used singly or as a combination of two or more thereof.

The inorganic particles blended should account for 0.1 part by weight or more and 5 parts by weight or less relative to 100 parts by weight of the polybutylene terephthalate resin powder material. The upper limit of the blending quantity is preferably 4 parts by weight, more preferably 3 parts by weight, still more preferably 2 parts by weight, and particularly preferably 1 part by weight.

The lower limit of the blending quantity is preferably 0.2 part by weight, more preferably 0.3 part by weight, and still more preferably 0.4 part by weight.

If the blending quantity of the inorganic particles is more than 5 parts by weight, they will fail to have a sufficiently large effect in decreasing the compressability of the polybutylene terephthalate resin powder mixture. They will not serve effectively to improve the flowability. If the blending quantity of the inorganic particles is less than 0.1 part by weight, on the other hand, they will not effectively improve the flowability.

Inorganic Reinforcement Material

An inorganic reinforcement material may be added with the aim of providing a shaped polybutylene terephthalate resin powder material having an increased strength.

Such an inorganic reinforcement material to be added to a polybutylene terephthalate resin powder material preferably has an average maximum size of 1 μm or more and 200 μm or less. The upper limit of the average maximum size of the inorganic reinforcement material is preferably 200 μm, more preferably 180 μm, still more preferably 170 μm, particularly preferably 160 μm, and extremely preferably 150 μm. The lower limit is preferably 1 μm, more preferably 5 μm, still more preferably 10 μm, and particularly preferably 15 μm. If the average maximum size of the inorganic reinforcement material is 200 μm or less, the polybutylene terephthalate resin powder mixture will not suffer from a deterioration in flowability, whereas if the average maximum size of the inorganic reinforcement material is 1 μm or more, a sufficiently large increase in strength will be achieved when shaping the polybutylene terephthalate resin powder mixture.

In a fibrous inorganic reinforcement material, the maximum size means the fiber length and the average maximum size means the average fiber length. In addition, it is preferable for the fiber diameter to be 0.1 μm or more and 50 μm or less. The lower limit of the fiber diameter is preferably 0.1 μm, more preferably 0.5 μm, and particularly preferably 1 μm. On the other hand, the upper limit of the fiber diameter is preferably 50 μm, more preferably 40 μm, and particularly preferably 30 μm. The fiber length and the fiber diameter are determined by observing a specimen by electron microscopy at a magnification of 1,000 times, randomly selecting 100 pieces of fiber in the image, and averaging their length measurements.

In a nonfibrous inorganic reinforcement material, the mean diameter is taken as the average maximum size. The mean diameter is measured by the same method as used for the polybutylene terephthalate resin powder material.

Inorganic reinforcement material of any substance may serve effectively as long as they have an average maximum particle diameter in the ranges given above, but preferred ones include: calcium carbonate powder materials such as precipitated calcium carbonate, heavy calcium carbonate, fine powdered calcium carbonate, and special calcium based fillers;

clay (aluminum silicate powder) materials such as nepheline-syenite fine powder, calcined clay of montmorillonite, bentonite and the like, and silane-modified clay;

talc;

silicic acid-containing compounds such as diatomaceous earth and silica sand;

crushed natural mineral materials such as pumice powder, pumice balloons, slate powder, and mica powder;

alumina-containing compounds such as alumina (aluminum oxide), alumina colloid (alumina sol), alumina white, and aluminum sulfate;

mineral materials such as barium sulfate, lithopone, calcium sulfate, molybdenum disulfide, and graphite (black lead);

glass based fillers such as glass fiber, glass beads, glass flakes, foamed glass beads; and others such as spherical fly ash particles, volcanic glass hollow particles, synthesize inorganic hollow particles, single-crystalline potassium titanate, carbon fiber, carbon nanotube, carbon hollow particles, carbon 64 fullerene, anthracite powder, artificial cryolite (cryolite), titanium oxide, magnesium oxide, basic magnesium carbonate, dolomite, potassium titanate, calcium sulfite, mica, asbestos, calcium silicate, aluminum powder, molybdenum sulfide, boron fiber, and silicon carbide fiber; of which more preferable are glass-based fillers and carbon fiber. These inorganic reinforcement materials may be used singly or as a combination of two or more thereof.

Production Method for Polybutylene Terephthalate Resin Powder Mixture

A powder material can be obtained by preparing polybutylene terephthalate resin particles with a large mean diameter or polybutylene terephthalate resin particles with a large uniformity coefficient (i.e., that are not uniform) to be used as raw material and processing them by an appropriate technique such as the spray drying method in which the raw material is crushed and dissolved in a solvent and then spray-dried, the poor solvent precipitation method in which an emulsion is formed in a solvent and then brought into contact with a poor solvent, the submerged drying method in which an emulsion is formed in a solvent, followed by drying and removing the organic solvent, and the forced melt-kneading method in which mechanically kneading the resin component to be processed into particles together with another resin component to form a sea-island structure, followed by removing the sea component using a solvent.

The adoption of crushing is preferred from the viewpoint of economic efficiency, but there are no specific limitations on the method to be used for crushing, and examples include the use of a jet mill, bead mill, hammer mill, ball mill, sand mill, turbo mill, and freeze crusher. The adoption of a dry crushing method using a turbo mill, jet mill, or freeze crusher is preferable, and the use of a freeze crusher is more preferable.

There are no specific limitations on the shape of the polybutylene terephthalate resin particles to be crushed, but polybutylene terephthalate resin produced by a technique used in common production processes is in the form of pellets.

Inorganic particles are added to the polybutylene terephthalate resin powder material. There are no specific limitations on the method to be used to produce a uniform resin powder material mixture, and a generally known method may be used to mix the resin powder material and inorganic particles. In an adoptable method, the inorganic particles may be added when performing the aforementioned crushing to allow the crushing and mixing to be carried out simultaneously.

Useful methods for the mixing include mixing by shaking, simultaneous mixing and crushing in a ball mill, coffee mill and the like, mixing by a device with a stirring blade such as Nauta mixer, Henschel mixer, and kneader, mixing by a rotating container type device such as V-shape rotating mixer, liquid phase mixing in a solvent followed by drying, mixing by stirring in an air flow in a flash blender, mixing by spraying powder material and/or slurry using an atomizer or the like, and mixing by using a twin screw extruder.

Polybutylene Terephthalate Resin Powder Mixture

A polybutylene terephthalate resin powder mixture prepared by adding inorganic particles, preferably together with an inorganic reinforcement material, to a polybutylene terephthalate resin powder material has the features of high powder flowability and low compressability. More specifically, the angle of repose is preferably 40° or less, more preferably 38° or less, and still more preferably 35° or less. Furthermore, it is possible to produce a polybutylene terephthalate resin powder mixture having a compressability of preferably 7.5 or less, more preferably 6.5 or less, and still more preferably 5.5 or less.

The angle of repose and the compressability are determined based on the Carr's flowability index measuring method ("Terminology Dictionary of Powder Technology—2nd Edition," edited by the Society of Powder Technology, Japan, published by Nikkan Kogyo Shimbun, Ltd., Mar. 30, 2000, pp. 56-57).

The polybutylene terephthalate resin powder mixture is used suitably as material for 3D printers.

EXAMPLES

Our methods will now be illustrated with reference to Examples and Comparative examples, but it should be understood that this disclosure is not construed as being limited only thereto. The measuring methods used are as described below.

Mean Diameter

The mean diameter of the polybutylene terephthalate resin powder material was measured with a laser diffraction/scattering type particle size distribution measuring apparatus (MT3300EXII manufactured by Nikkiso Co., Ltd.) using 0.5 mass % aqueous solution of polyoxyethylene cumyl phenyl ether (trade name Nonal 912A, manufactured by Toho Chemical Industry Co., Ltd., hereinafter referred as Nonal 912A) as dispersion medium. Specifically, the microtracking technique was used to determine the total volume of the fine particles based on analysis of scattered laser light to prepare a cumulative data curve in which the total volume accounted for 100%, and then the particle diameter at the 50% point (accumulated from the small diameter end) in the cumulative data curve (median diameter, d50) was taken as the mean diameter of the polybutylene terephthalate resin powder material.

The mean diameter of fumed silica was determined by observing a specimen by electron microscopy at a magnification of 100,000 times, randomly selecting 100 particles in the image, measuring their maximum lengths, which were assumed to represent their particle diameters, and calculating the number average value to represent their mean diameter. For other types of silica than fumed silica, the same method as used for the polybutylene terephthalate resin powder material was used to determine the mean diameter.

Intrinsic Viscosity

Regarding the intrinsic viscosity of the PBT resin, solutions with concentrations of 1.0 dl/g, 0.5 dl/g, or 0.25 dl/g were prepared and the solution viscosity of each solution was measured at 25° C. using an Ubbelohde type viscometer, followed by extrapolation to a concentration of 0 to determine the intrinsic viscosity.

Quantity of Terminal Carboxyl Groups

The quantity of terminal carboxyl groups in the PBT resin was determined by adding 2.0 g of PBT to 50 ml of an o-cresol/chloroform solvent (weight ratio 2:1), dissolving it by heating, cooling it, adding 30 ml of chloroform, and adding 5 ml of a 12% methanolic lithium chloride solution, and the resulting solution was subjected to potentiometric titration with ethanolic potassium hydroxide to take measurements.

Maximum Size

The maximum size of inorganic reinforcement material was determined by observing a specimen by electron microscopy at a magnification of 1,000 times, randomly selecting 100 particles in the image, measuring their maximum lengths, and calculating the number average value to represent their maximum size.

Uniformity Coefficient

To determine the uniformity coefficient of the polybutylene terephthalate resin powder mixture, the particle diameter distribution was measured with a laser diffraction/scattering type particle size distribution measuring apparatus (MT3300EXII, manufactured by Nikkiso Co., Ltd.) and the d60/d10 ratio was taken as the uniformity coefficient of the polybutylene terephthalate resin powder material. A broader particle size distribution gives a larger uniformity coefficient.

Angle of Repose

The angle of repose of the polybutylene terephthalate resin powder mixture was measured with a powder tester (PT-N, manufactured by Hosokawa Micron Corporation).

Compressability

The compressability of the polybutylene terephthalate resin powder mixture was calculated by the equation given below from the loose bulk density and the tight bulk density measured by a powder tester (PT-N, manufactured by Hosokawa Micron Corporation):

$$\text{Compressability} = (\text{tight bulk density} - \text{loose bulk density}) / \text{tight bulk density} \times 100.$$

Tensile Strength

To determine the tensile strength of a shaped product of the polybutylene terephthalate resin powder mixture, an ISO 1A test piece was prepared by supplying a polybutylene terephthalate resin particle mixture to a powder bed fusion type 3D printer and shaping it while controlling the powder surface temperature at 180° C. to 200° C. and subjected to measurement by universal tester (Tensilon universal tester RTG-1250, manufactured by A&D Company, Limited). Six measurements were taken according to the procedure specified in ISO-527-1 and their average was adopted as the tensile strength.

Production Example 1

In a production unit having a slurry production tank, a slurry storage tank, an esterification reaction tank, a preliminary polymerization tank, a final polymerization apparatus, and a pelletizer connected in series, terephthalic acid and 1,4-butanediol were supplied at a ratio of 754 kg to 736 kg to the slurry production tank, where they were mixed by stirring to prepare a slurry. The resulting slurry was then transferred to the slurry storage tank maintained at a constant temperature of 50° C. and sent by a pump from the slurry storage tank to the complete mixing tank type esterification reaction tank equipped with a fractionating column at a constant rate of 1,490 kg/hour while at the same time, tetra-n-butyl titanate (TBT) was supplied continuously at a rate of 0.4 kg/hour to the flow of 1,4-butanediol refluxed at a rate of 600 kg/hour from the fractionating column attached to the esterified reaction tank. The reaction conditions of the esterification reaction tank included a temperature of 230° C., a constant pressure of 90 kPa, and a residence time of 1.8 hours, and tetrahydrofuran and water were distilled out from the top of the fractionating column while 1,4-butanediol was refluxed from the bottom of the fractionating column to produce an oligomer. Following this, the oligomer was supplied by a gear pump to the preliminary condensation polymerization tank and subjected to condensation polymerization under the conditions of a reaction temperature of 255° C., a constant pressure of 5.0 kPa, and a residence time of 2 hours to provide a low polymer.

This low polymer was supplied to the condensation polymerization tank (lateral-type biaxial reaction unit) and subjected to condensation polymerization under the conditions including a temperature of 252° C., a pressure of 120 Pa, and a residence time of 1.5 hours to produce a polymer. This polymer was discharged by a gear pump out of the system through a polymer filter and a die to produce a strand, which was cooled with cooling water and pelletized by a pelletizer to provide PBT-1. The PBT-1 had an intrinsic viscosity of 0.97 dl/g and a terminal carboxyl group quantity of 38 eq/t.

Production Example 2

Except for adjusting the esterification reaction tank to a pressure of 75 kPa, the preliminary condensation polymerization tank to a pressure of 2.0 kPa, and the condensation polymerization tank (lateral-type biaxial reaction unit) to a temperature of 248° C., the same procedure as in Production example 1 was carried out to provide PBT-2. The PBT-2 had an intrinsic viscosity of 0.97 dl/g and a terminal carboxyl group quantity of 18 eq/t.

Example 1

PBT-1 was subjected to crushing for 120 minutes in a jet mill (100 AFG, manufactured by Hosokawa Micron Corporation) to produce a powder material having a mean diameter of 50 μm and a uniformity coefficient of 2.9. Spherical silica particles with a mean diameter of 50 nm produced by the sol-gel method and surface-treated with hexamethyl disilazane (X-24-9404, manufactured by Shin-Etsu Chemical Co., Ltd.) were added to this powder material at a ratio of 0.05 kg to 10 kg and mixed by shaking. The resulting powder mixture had an angle of repose of 36° and a compressability of 5.2%. This PBT resin powder material was shaped by a powder bed fusion type 3D printer (Rafael 300 HT, manufactured by Aspect Inc.) to produce a shaped product. It had a tensile strength of 30 MPa. Residual powder left after shaping had an intrinsic viscosity of 0.98 dl/g.

Example 2

Except for adding 0.3 kg of the inorganic particles, the same procedure as in Example 1 was carried out to produce a polybutylene terephthalate resin powder mixture. The resulting powder mixture had an angle of repose of 31° and a compressability of 5.3%. This PBT resin powder material was shaped by a powder bed fusion type 3D printer (Rafael 300 HT, manufactured by Aspect Inc.) to produce a shaped product. The shaped product had a tensile strength of 28 MPa. Residual powder left after shaping had an intrinsic viscosity of 0.98 dl/g.

Example 3

Except that the inorganic particles added were spherical silica particles with a mean diameter of 110 nm produced by the sol-gel method and surface-treated with hexamethyl dicisilazane (X-24-9163A, manufactured by Shin-Etsu Chemical Co., Ltd.), the same procedure as in Example 1 was carried out to produce a polybutylene terephthalate resin powder mixture. The resulting powder mixture had an angle of repose of 38° and a compressability of 5.5%. This PBT resin powder material was shaped by a powder bed fusion type 3D printer (Rafael 300 HT, manufactured by Aspect Inc.) to produce a shaped product. The shaped product had a tensile strength of 29 MPa. Residual powder left after shaping had an intrinsic viscosity of 0.98 dl/g.

Comparative Example 1

Except for not adding inorganic particles, the same procedure as in Example 1 was carried out to produce a polybutylene terephthalate resin powder material. The resulting powder mixture had an angle of repose of 45° and a compressability of 17.1%. An attempt was made to shape this PBT resin powder material by a powder bed fusion type 3D printer (Rafael 300 HT, manufactured by Aspect Inc.), but failed to produce a shaped product due to roughening of powder surface that occurred in the powder layer stacking step. Residual powder left after shaping had an intrinsic viscosity of 0.98 dl/g.

Comparative Example 2

Except for adding 1 kg of the inorganic particles, the same procedure as in Example 1 was carried out to produce a polybutylene terephthalate resin powder material. The resulting powder mixture had an angle of repose of 33° and a compressability of 9.0%. This PBT resin powder material was shaped by a powder bed fusion type 3D printer (Rafael 300 HT, manufactured by Aspect Inc.) to produce a shaped product. The shaped product had a tensile strength of 5 MPa. Residual powder left after shaping had an intrinsic viscosity of 0.97 dl/g.

Comparative Example 3

Except that the inorganic particles added were fumed silica particles with a mean diameter of 7 nm (AEROSIL380, manufactured by EVONIK), the same procedure as in Example 1 was carried out to produce a polybutylene terephthalate resin powder material. The resulting powder mixture had an angle of repose of 35° and a compressability of 7.9%. This PBT resin powder material was shaped by a powder bed fusion type 3D printer (Rafael 300 HT, manufactured by Aspect Inc.) to produce a shaped product. The shaped product had a tensile strength of 8 MPa. Residual powder left after shaping had an intrinsic viscosity of 0.97 dl/g.

Comparative Example 4

PBT-1 was subjected to crushing for 30 minutes in a jet mill (100 AFG, manufactured by Hosokawa Micron Corporation) to produce a powder material having a mean diameter of 90 μm and a uniformity coefficient of 5.7. Spherical silica particles with a mean diameter of 50 nm produced by the sol-gel method and surface-treated with hexamethyl disilazane (X-24-9404, manufactured by Shin-Etsu Chemical Co., Ltd.) were added to this powder material at a ratio of 0.05 kg to 10 kg and mixed by shaking. The resulting powder mixture had an angle of repose of 40° and a compressability of 7.9%. This PBT resin powder material was shaped by a powder bed fusion type 3D printer (Rafael 300 HT, manufactured by Aspect Inc.) to produce a shaped product. The shaped product had a tensile strength of 10 MPa. Residual powder left after shaping had an intrinsic viscosity of 0.98 dl/g.

Example 4

PBT-1 was subjected to crushing for 120 minutes in a jet mill (100 AFG, manufactured by Hosokawa Micron Corporation) to produce a powder material having a mean diameter of 50 μm and a uniformity coefficient of 2.9. To 7 kg of this powder material, 0.05 kg of spherical silica particles with a mean diameter of 50 nm produced by the sol-gel method and surface-treated with hexamethyl disilazane (X-24-9404, manufactured by Shin-Etsu Chemical Co., Ltd.) and 3 kg of glass beads with a maximum size of 30 μm (EGB731B, manufactured by Potters-Ballotini Co., Ltd.) were added and mixed by shaking. The resulting powder mixture had an angle of repose of 37° and a compressability of 4.9%. This PBT resin powder material was shaped by a powder bed fusion type 3D printer (Rafael 300 HT, manufactured by Aspect Inc.) to produce a shaped product. The shaped product had a tensile strength of 45 MPa. Residual powder left after shaping had an intrinsic viscosity of 0.98 dl/g.

Example 5

Except for adding 7 kg of the inorganic reinforcement material, the same procedure as in Example 4 was carried out to produce a polybutylene terephthalate resin powder mixture. The resulting powder mixture had an angle of repose of 32° and a compressability of 4.3%. This PBT resin powder material was shaped by a powder bed fusion type 3D printer (Rafael 300 HT, manufactured by Aspect Inc.) to produce a shaped product. The shaped product had a tensile strength of 48 MPa. Residual powder left after shaping had an intrinsic viscosity of 0.98 dl/g.

Example 6

Except that the inorganic reinforcement material added was glass flakes with a maximum size of 50 μm (REF-015 A, manufactured by Nippon Sheet Glass Company, Ltd.), the same procedure as in Example 4 was carried out to produce a polybutylene terephthalate resin powder mixture. The resulting powder mixture had an angle of repose of 36° and a compressability of 5.1%, and the film had a tensile strength of 21 MPa.

Example 7

Except that the inorganic reinforcement material added was glass fiber with a maximum size of 120 μm (EPG70M-01N, manufactured by Nippon Electric Glass Co., Ltd.), the same procedure as in Example 4 was carried out to produce a polybutylene terephthalate resin powder mixture. The resulting powder mixture had an angle of repose of 40° and a compressability of 6.1%. This PBT resin powder material was shaped by a powder bed fusion type 3D printer (Rafael 300 HT, manufactured by Aspect Inc.) to produce a shaped product. The shaped product had a tensile strength of 55 MPa. Residual powder left after shaping had an intrinsic viscosity of 0.98 dl/g.

Example 8

Except that the inorganic reinforcement material added was carbon fiber with a maximum size of 180 μm (Panex35, manufactured by Zoltek), the same procedure as in Example 4 was carried out to produce a polybutylene terephthalate resin powder mixture. The resulting powder mixture had an angle of repose of 34° and a compressability of 6.1%. This PBT resin powder material was shaped by a powder bed fusion type 3D printer (Rafael 300 HT, manufactured by Aspect Inc.) to produce a shaped product. The shaped product had a tensile strength of 64 MPa. Residual powder left after shaping had an intrinsic viscosity of 0.98 dl/g.

Comparative Example 5

PBT-2 was subjected to crushing for 120 minutes in a jet mill (100 AFG, manufactured by Hosokawa Micron Corporation) to produce a powder material having an average particle diameter of 50 μm and a uniformity coefficient of 3.2. Spherical silica particles with a mean diameter of 50 nm produced by the sol-gel method and surface-treated with hexamethyl disilazane (X-24-9404, manufactured by Shin-Etsu Chemical Co., Ltd.) were added to this powder material at a ratio of 0.05 kg to 10 kg and mixed by shaking. The resulting powder mixture had an angle of repose of 37° and a compressability of 6.0%. This PBT resin powder material was shaped by a powder bed fusion type 3D printer (Rafael 300 HT, manufactured by Aspect Inc.) to produce a shaped product. The shaped product had a tensile strength of 27 MPa. Residual powder left after shaping had an intrinsic viscosity of 1.31 dl/g.

TABLE 1

| | PBT resin | | | | | Inorganic particles | | Inorganic reinforcement material | | | PBT resin powder mixture | | Shaping by 3D printer | | |
| --- | --- | --- | --- | --- | --- | --- | --- | --- | --- | --- | --- | --- | --- | --- | --- |
| | content (kg) | intrinsic viscosity (dl/g) | quantity of terminal carboxyl groups (eq/t) | mean diameter (μm) | uniformity coefficient | mean diameter (nm) | content (kg) | type | maximum size (μm) | content (kg) | angle of repose (°) | compressability (%) | roughening of powder surface | strength of shaped product (MPa) | intrinsic viscosity of powder after shaping (dl/g) |
| Example 1 | 10 | 0.97 | 38 | 50 | 2.9 | 50 | 0.05 | — | — | — | 36 | 5.2 | not found | 30 | 0.98 |
| Example 2 | 10 | 0.97 | 38 | 50 | 2.9 | 50 | 0.3 | — | — | — | 31 | 5.3 | not found | 28 | 0.98 |
| Example 3 | 10 | 0.97 | 38 | 50 | 2.9 | 110 | 0.05 | — | — | — | 38 | 5.5 | not found | 29 | 0.98 |

TABLE 1-continued

| | PBT resin | | | | | Inorganic particles | | Inorganic reinforcement material | | | PBT resin powder mixture | | Shaping by 3D printer | | |
|---|---|---|---|---|---|---|---|---|---|---|---|---|---|---|---|
| | content (kg) | intrinsic viscosity (dl/g) | quantity of terminal carboxyl groups (eq/t) | mean diameter (μm) | uniformity coefficient | mean diameter (nm) | content (kg) | type | maximum size (μm) | content (kg) | angle of repose (°) | compressability (%) | roughening of powder surface | strength of shaped product (MPa) | intrinsic viscosity of powder after shaping (dl/g) |
| Example 4 | 7 | 0.97 | 38 | 50 | 2.9 | 50 | 0.05 | glass beads | 30 | 3 | 37 | 4.9 | not found | 45 | 0.98 |
| Example 5 | 7 | 0.97 | 38 | 50 | 2.9 | 50 | 0.05 | glass beads | 30 | 7 | 32 | 4.3 | not found | 48 | 0.98 |
| Example 6 | 7 | 0.97 | 38 | 50 | 2.9 | 50 | 0.05 | glass beads | 50 | 3 | 36 | 5.1 | not found | 51 | 0.98 |
| Example 7 | 7 | 0.97 | 38 | 50 | 2.9 | 50 | 0.05 | glass beads | 120 | 3 | 40 | 6.1 | not found | 55 | 0.98 |
| Example 8 | 7 | 0.97 | 38 | 50 | 2.9 | 50 | 0.05 | carbon fiber | 180 | 3 | 34 | 6.1 | not found | 64 | 0.98 |
| Comparative Example 1 | 10 | 0.97 | 38 | 50 | 2.9 | — | — | — | — | — | 45 | 17.1 | found | — | 0.98 |
| Comparative Example 2 | 10 | 0.97 | 38 | 50 | 2.9 | 7 | 1 | — | — | — | 33 | 9.0 | not found | 5 | 0.97 |
| Comparative Example 3 | 10 | 0.97 | 38 | 50 | 2.9 | 7 | 0.05 | — | — | — | 35 | 7.9 | not found | 8 | 0.97 |
| Comparative Example 4 | 10 | 0.97 | 38 | 90 | 5.7 | 50 | 0.05 | — | — | — | 40 | 7.9 | not found | 10 | 0.98 |
| Comparative Example 5 | 10 | 0.97 | 18 | 50 | 3.2 | 50 | 0.05 | — | — | — | 37 | 6.0 | not found | 27 | 1.31 |

INDUSTRIAL APPLICABILITY

The polybutylene terephthalate resin powder mixture is high in flowability and low in the rate of solid phase polymerization at elevated temperatures, and accordingly useful as shaping material for powder bed fusion type 3D printers. Furthermore, high-strength shaped products can be obtained when the polybutylene terephthalate resin powder mixture is shaped by a powder bed fusion type 3D printer.

The invention claimed is:

1. A method of producing polybutylene terephthalate resin shaped moldings comprising supplying a powder bed fusion 3D printer with a polybutylene terephthalate resin powder mixture that contains 100 parts by weight of a polybutylene terephthalate resin powder material having a mean diameter of more than 1 μm and 100 μm or less, a uniformity coefficient of 4 or less, and a terminal carboxyl group quantity of 35 eq/t or more and 50 eq/t or less, and 0.1 to 5 parts by weight of inorganic particles having a mean diameter of 20 to 500 nm, and irradiating a laser to the polybutylene terephthalate resin powder mixture in the powder bed fusion 3D printer to melt the polybutylene terephthalate resin powder mixture.

2. The method as set forth in claim 1, wherein the inorganic particles are silica particles.

3. The method as set forth in claim 1, wherein an inorganic reinforcement material having an average maximum size of 1 μm or more and 200 μm or less accounts for 25 to 150 parts by weight relative to 100 parts by weight of the polybutylene terephthalate resin powder material.

4. The method as set forth in claim 3, wherein the inorganic reinforcement material is at least one selected from the group consisting of glass beads, glass flakes, glass fiber, carbon fiber, aluminum oxide, soda lime glass, borosilicate glass, aluminosilicate ceramics, limestone, gypsum, bentonite, precipitated sodium silicate, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement, and zinc oxide.

5. The method as set forth in claim 2, wherein an inorganic reinforcement material having an average maximum size of 1 μm or more and 200 μm or less accounts for 25 to 150 parts by weight relative to 100 parts by weight of the polybutylene terephthalate resin powder material.

6. The method as set forth in claim 5, wherein the inorganic reinforcement material is at least one selected from the group consisting of glass beads, glass flakes, glass fiber, carbon fiber, aluminum oxide, soda lime glass, borosilicate glass, aluminosilicate ceramics, limestone, gypsum, bentonite, precipitated sodium silicate, amorphous precipitated calcium silicate, amorphous precipitated magnesium silicate, amorphous precipitated lithium silicate, sodium chloride, Portland cement, magnesium phosphate cement, magnesium oxychloride cement, magnesium oxysulfate cement, zinc phosphate cement, and zinc oxide.

* * * * *